No. 754,210. PATENTED MAR. 8, 1904.
A. FYRBERG.
FIREARM.
APPLICATION FILED OCT. 28, 1901.
NO MODEL. 2 SHEETS—SHEET 1.

Witnesses:
Walter B. Nourse.
Everett N. Barker.

Inventor:
Andrew Fyrberg.
By A. A. Barker, Att'y.

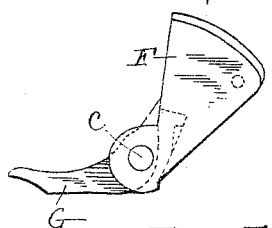
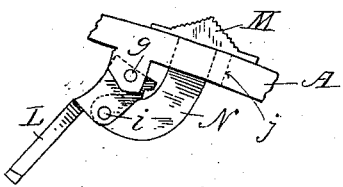
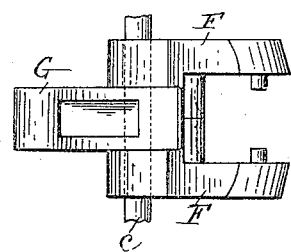
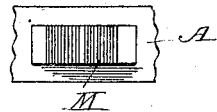
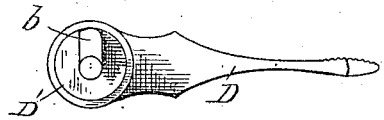
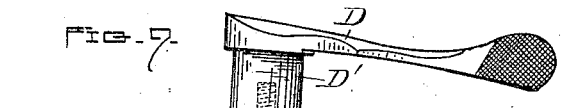
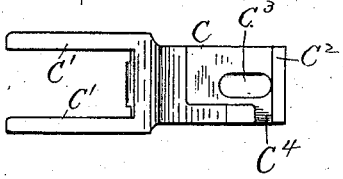
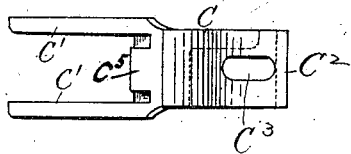
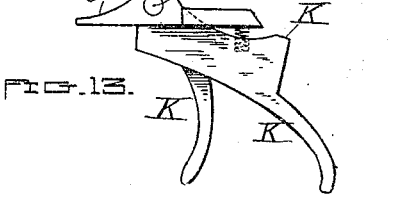
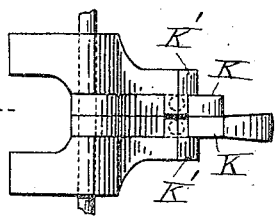
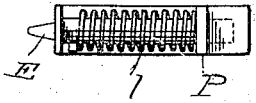

No. 754,210. Patented March 8, 1904.

UNITED STATES PATENT OFFICE.

ANDREW FYRBERG, OF WORCESTER, MASSACHUSETTS.

FIREARM.

SPECIFICATION forming part of Letters Patent No. 754,210, dated March 8, 1904.

Application filed October 28, 1901. Serial No. 30,187. (No model.)

*To all whom it may concern:*

Be it known that I, ANDREW FYRBERG, of the city and county of Worcester and State of Massachusetts, have invented certain new and useful Improvements in Firearms; and I do hereby declare that the following is a full, clear, and exact description thereof, reference being had to the accompanying drawings, forming a part of this specification, and in which—

Figure 1:
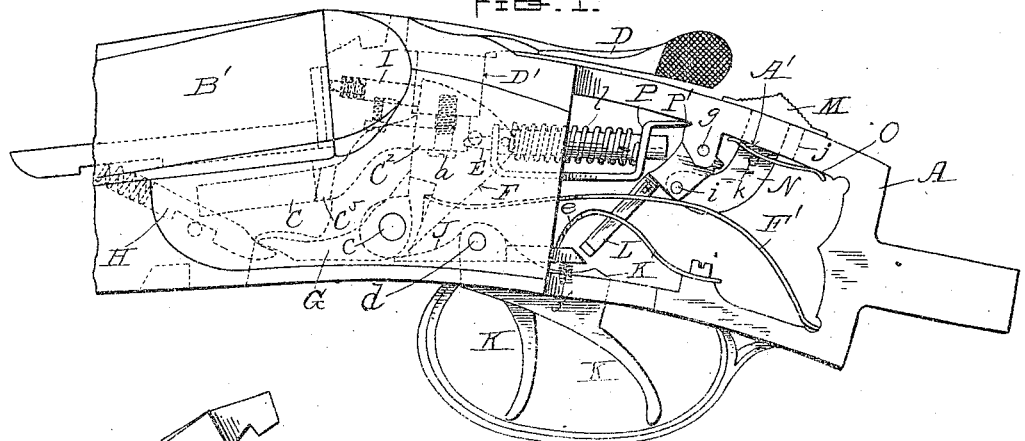
Figure 2:
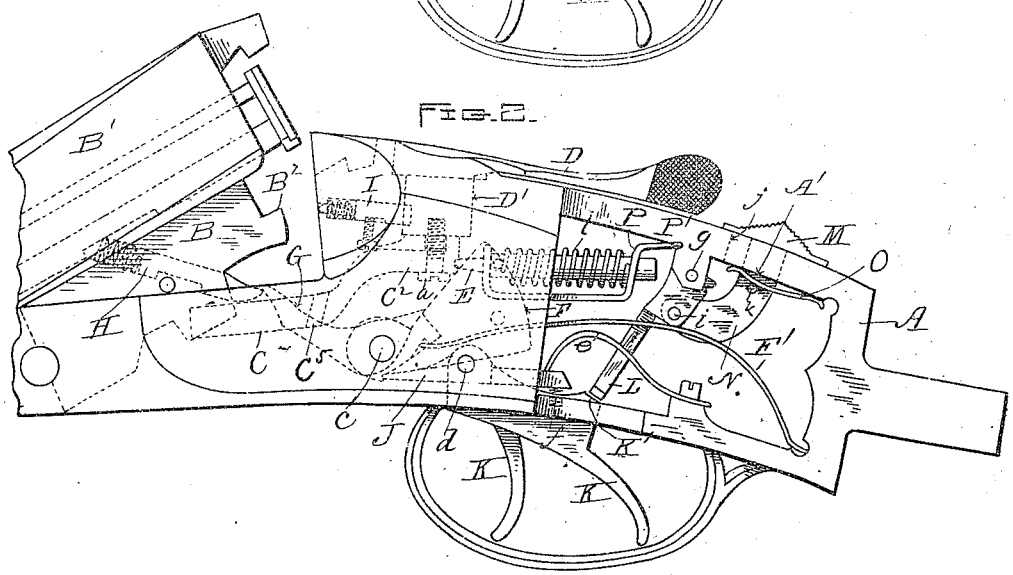
Figure 3:
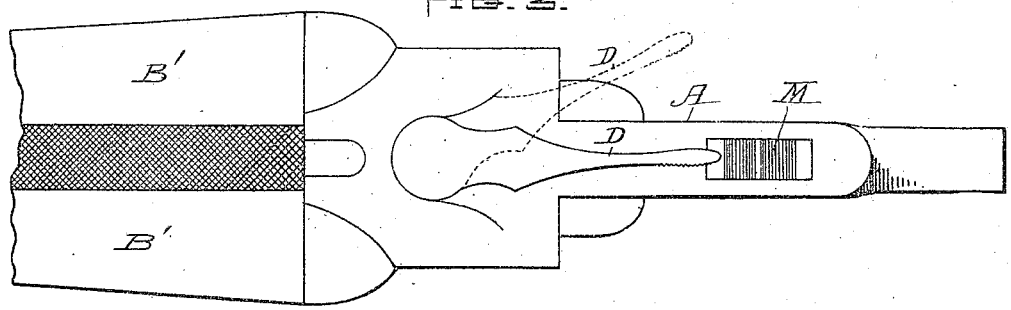

Figure 1 represents so much of the side view of a double-barrel breech-loading gun as is necessary to illustrate my improvements thereon, the various parts being shown in the positions which they occupy when the gun is not in use with the barrel-frame locked and the hammers down, the triggers in this view being shown unlocked. Fig. 2 is a similar view to Fig. 1, showing the various parts in the positions which they occupy after the barrel-frame has been unlocked from the breech and said frame and the barrels swung down to extract the empty cartridge-shells and cock the hammers preparatory to loading the gun, the triggers being shown locked in this instance. Fig. 3 is a top or plan view of the parts of the gun shown in Figs. 1 and 2. Figs. 4 to 15, inclusive, are detached detail views of the various operating parts of the gun, Figs. 4 and 5 being a side and a top or plan view, respectively, of the hammers. Fig. 6 shows part of the main frame and a side view of my improved trigger-locking device. Fig. 7 is a top view of the locking-lever of said device. Fig. 8 is a top view of the thumb-slide coming above the frame for operating said trigger-locking device by hand. Fig. 9 is a side view of the top lever and locking-plate for locking and unlocking the barrel-frame from the breech. Fig. 10 is an inverted plan view of the top lever. Figs. 11 and 12 are a top and bottom view, respectively, of said locking-plate shown in Fig. 9. Figs. 13 and 14 are side and top views, respectively, of the triggers and the pawls thereof, whose forward ends engage with the hammers; and Fig. 15 is a top or plan view of the spring-spindle, whereby the trigger-locking device is automatically operated by swinging around the top lever, as will be hereinafter described.

My invention consists of certain improvements in the operating parts of the gun, whereby the various parts may be made simple in construction, effective in operation, and at as small cost as possible, the principal or essential feature thereof being an improved mechanism whereby the triggers may be securely and safely locked, both automatically and by hand, as will be hereinafter more fully set forth.

To enable others skilled in the art to which my invention appertains to better understand the nature and purpose thereof, I will now proceed to describe it more in detail.

In the drawings I have shown, as before stated, only such parts as are necessary to illustrate my improvements, and as said improvements relate to the operating mechanism only the central part of the gun is shown, the barrels thereof being shown broken off about at the pivot-point and the "stock" at the opposite end also being left off.

In the drawings, A represents the hollow metal frame within which is arranged said operating mechanism. To the rear end of said frame is attached the stock, and to its forward end is pivoted the barrel-frame B, forming the supporting-base for the double barrels B' B'. C represents the locking-plate for locking said barrel-frame when the gun is closed, as shown in Fig. 1. Said plate is provided with two arms C' C', extending forward and fitted to slide longitudinally in suitable guideways in frame A. The rear end $C^2$ of said plate engages with the head D' of top lever D. It also engages with the forward end of a longitudinally-arranged horizontal spring-bolt E, hereinafter described. Said end $C^2$ of plate C is eccentrically pivoted to the head D' by means of a vertical screw $a$, the opening $C^3$ in said head for the reception of said screw being oblong in shape, as is shown in Figs. 11 and 12, to admit of longitudinal motion, so that when the head D' of the top lever is turned the locking-plate may be moved longitudinally. Motion is imparted from head D' to thus operate the locking-plate by means of a stud $b$, formed on said head, which fits in a slot $C^4$ in the upper side of the end $C^2$. The normal positions of said locking-plate and top lever are as shown by full lines in the drawings, being the positions which they occupy when the gun is closed and locked, as is shown in Fig. 1. To unlock the same and swing down the barrels, as is shown in Fig. 2, the top lever is swung around laterally, as is shown by dotted lines in Fig. 3, this operation causing the part C⁵ of the locking-plate to be drawn back from over the lug B² of barrel-frame B, and thereby releasing the same, so that the barrels may be swung down, as aforesaid.

F F represent the hammers, which are pivoted to a transverse pin c, and G is the cocking-lever, also pivoted to said pin and whose forward end is adapted to engage with the lower end of the usual cocking spring-spindle H, located in the barrel-frame B, the hammers being raised or cocked by said spring-spindle and cocking-lever by the operation of swinging down the barrels and sprung forward to strike the firing-pins I by means of the springs F' when said hammers are released by pulling the triggers K K, as usual. The hammers are locked in their elevated or cocked positions by means of the sears J J, which are pivoted to the same pivot d as the triggers K K and are held in position by the springs e and f.

The parts thus far described, except the spring-bolt E, are substantially the same as in other guns of this class, and I therefore make no claim thereto, except in combination with my improvements.

My improved mechanism for locking the triggers is constructed and arranged to operate as follows: A vertically-arranged lever L is located back of the hammers and over the triggers, which is pivoted at its upper end to a transverse pin g in the upper part of frame A and whose lower end is adapted to engage with the back ends of the triggers to hold said triggers from being forced up by the fingers or otherwise. Said lever L is adapted to be swung or moved in the longitudinal direction of the gun from the position shown in Fig. 1 to that shown in Fig. 2, and vice versa, in the operations of locking or unlocking the triggers. The triggers are locked when said lever occupies the position shown in Fig. 2, with the lower end of the lever over the bearing-points K' K' of said triggers, and unlocked when moved forward in front thereof, as is shown in Fig. 1. They may be both locked and unlocked by hand and also locked but not unlocked automatically. The operation of locking and unlocking them by hand is performed by pushing the thumb-slide M forward or back, said thumb-slide being mounted on the upper end of a curved arm N, whose lower end is pivoted at i to the upper end of said lever L under pivot g. To admit of said movements of the parts, a vertical slot is formed in frame A where the curved arm N passes down through, (see dotted lines j,) which also limits the length of said movements. Friction may be imparted to hold the thumb-piece M, arm N, and lever L in their adjusted positions by means of a suitable spring O—in this instance interposed between a transverse pin k and the under side A' of frame A. The same operation that unlocks the barrels, so that they may be swung down, also automatically operates the lever L (which may be termed the "safety-lever") to lock the triggers. This is done by swinging the top lever D to one side, as previously described, which causes its head D' to be turned a partial revolution and the locking-plate C to be moved back a short distance, thereby also moving the spring-bolt E back longitudinally a corresponding distance through its engagement with the end C² of plate C, as previously described. The bolt E is made of the proper length to engage with the front side of the safety-lever L when thus moved back longitudinally, and consequently when the bolt is moved back the lever is moved with it from the position shown in Fig. 1 to that shown in Fig. 2, thereby securely locking the triggers, which remain locked until said safety-lever is moved forward again by hand out of engagement with said triggers, as previously described. The bolt E is held in engagement with the rear end of locking-plate C by means of a suitable spring adapted to impart a constant forward yielding pressure. In this instance a spiral spring l is shown as being employed, the same being fitted over the bolt, its forward end secured thereto, and its opposite end adapted to bear against the frame P, which supports the bolt. Said frame P is supported in place by its rear end resting in a slot P' in frame A and by the front end of bolt E being seated in a cavity in the rear end of locking-plate C. The purpose of thus constructing said trigger safety-lock device is to positively insure said triggers being always locked, except when unlocked by hand just prior to discharging the gun.

As will be seen from the foregoing description, it is impossible to unlock the barrel-frame without locking the triggers, and they must thus remain locked until they are unlocked by pushing forward the thumb-slide M. They cannot be otherwise unlocked, and consequently the liability of the accidental discharge of the gun is reduced to a minimum. Therefore many accidents caused by the triggers being accidentally operated by catching against the limb of a tree, a trailing vine, or other obstruction cannot occur where my improved trigger safety-lock is employed.

The device is simple in construction, strong, durable, and inexpensive and withal absolutely positive in effecting the desired result, as aforesaid.

Although I have described my invention as being applied to a double-barrel gun, I do not limit myself thereto, but reserve the right to apply it to any firearm to which it may be adapted.

Having now described my invention, what I claim therein as new, and desire to secure by Letters Patent, is—

1. In a firearm the combination of main frame A, top lever D, its hub D', barrel-locking plate C and trigger K, with horizontal, longitudinal bolt E, its supporting-frame, means for imparting a forward, yielding pressure to said bolt, bolt E being interposed between the rear end C² of plate C and vertical lock-lever L; said lock-lever L, slide M, its inward-extending arm N, and means for holding said slide and arm in their adjusted positions, the lock-lever L being pivoted at its upper end to a fixed bearing and just below said pivot to the inner end of said arm N, so that it may be operated to engage and disengage its lower end to and from the trigger, either by moving the slide M, or by the operation of the top lever, substantially as set forth.

2. In a firearm, the combination of main frame A, top lever D, its hub D', barrel-locking plate C and trigger K, with horizontal longitudinal bolt E, its supporting-frame, means for imparting a forward yielding pressure to said bolt, and vertical lock-lever L, the latter being pivoted at its upper end to a fixed bearing, and its lower end adapted to be engaged and disengaged to and from the trigger, by the operation of the top lever and the bolt-actuating spring, substantially as set forth.

3. In a firearm, the combination of main frame A and trigger K, with the vertically-arranged lock-lever L, pivoted at its upper end to a fixed bearing on said frame A, slide M, and its arm N, and means for holding said slide and arm in their adjusted positions, the arm extending inward and forward from the slide, and pivoted at its inner end to said lock-lever L below its fixed pivot, the lower end of the lock-lever L being adapted to be engaged and disengaged to and from the trigger, substantially as set forth.

ANDREW FYRBERG.

Witnesses:
  A. A. BARKER,
  W. B. NOURSE.